United States Patent [19]

Nakajima et al.

[11] Patent Number: 4,689,676
[45] Date of Patent: Aug. 25, 1987

[54] TELEVISION VIDEO SIGNAL SYNCHRONIZING APPARATUS

[75] Inventors: Takeshi Nakajima; Toshitake Kouyama; Masashi Onosato, all of Tokyo, Japan

[73] Assignees: Tokyo Broadcasting System, Inc.; NEC Corp., both of Japan

[21] Appl. No.: 596,688

[22] Filed: Apr. 4, 1984

[30] Foreign Application Priority Data

Apr. 6, 1983 [JP] Japan .................................. 58-60265

[51] Int. Cl.$^4$ .............................................. H04N 5/04
[52] U.S. Cl. ..................................... 358/149; 358/148
[58] Field of Search ............... 358/149, 160, 320, 337, 358/339, 214, 54, 148, 21 V; 360/36.2

[56] References Cited

U.S. PATENT DOCUMENTS

| | | | |
|---|---|---|---|
| 4,134,131 | 1/1979 | Hopkins, Jr. ........................ | 358/149 |
| 4,148,070 | 4/1979 | Taylor .................................. | 358/160 |
| 4,330,846 | 5/1982 | Colles et al. ....................... | 360/36.2 |
| 4,346,407 | 8/1982 | Baer et al. .......................... | 358/149 |
| 4,532,541 | 7/1985 | Cooper ................................ | 358/320 |

Primary Examiner—Tommy P. Chin
Assistant Examiner—David E. Harvey
Attorney, Agent, or Firm—Ostrolenk, Faber, Gerb & Soffen

[57] ABSTRACT

A television video signal synchronizing apparatus, which synchronizes an input television video signal to a reference timing mark. The input video signal is digitized and stored in a memory at locations which are provided by a writing address generator. The writing operation is performed in synchronism with the input video signal. A reading address generator produces reading addresses for reading out the stored video signal to deliver an output television signal which is synchronized to the reference timing mark. The reading address generator is controlled to read out an active video portion of the stored video signal after a delay of about one horizontal scanning period (63.5 microseconds in the NTSC system) immediately after the writing operation of the same active video portion. Thereby "lip lag" i.e. a mismatch between the audio and video signals, is avoided.

9 Claims, 6 Drawing Figures

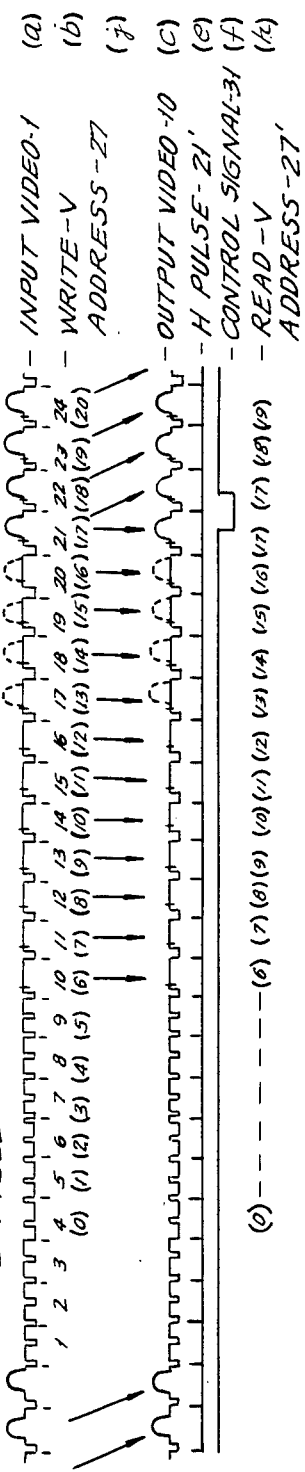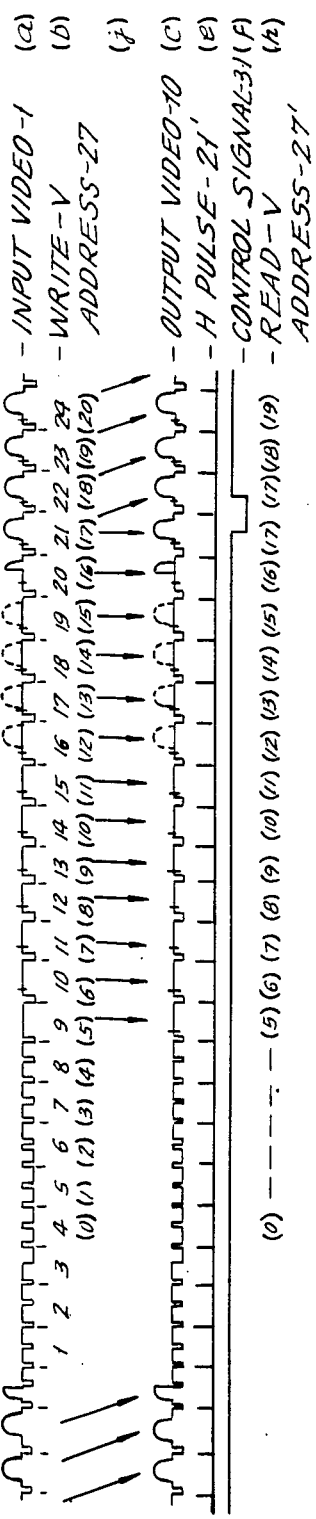

TELEVISION VIDEO SIGNAL SYNCHRONIZING APPARATUS

BACKGROUND OF THE INVENTION

The present invention relates to a television video signal synchronizing apparatus which synchronizes an input television video signal with a reference timing signal.

A television video signal synchronizing apparatus (frame synchronizer) is ordinarily used to synchronize a television video signal transmitted from one television broadcasting station with a reference synchronizing timing of another television broadcasting station where the television video signal synchronizing apparatus is located, and the technique for synchronizing a television video signal is disclosed in, for example, the U.S. Pat. Nos. 3,909,839 and 4,007,486.

Recently, within a single television broadcasting station, such frame synchronizer has been frequently employed in order to cancel a slight phase difference (synchronous difference) between video signals delivered from different video sources such as signals from a studio room and a VTR room. The compensation to cancel the slight phase difference is required when a plurality of video signals which are delivered from the respective video sources, are composed (combined) to make a special effect television picture, for example. The use of a frame synchronizer in this way is referred to as a common synchronism use, and will be so referred to hereinafter.

When the frame synchronizer is used for the common synchronism use, i.e., used for cancelling the slight synchronous difference from sources in the same television broadcasting station, the output video signal delivered therefrom is unavoidably delayed from its input video signal by about one frame period (33 m sec in the NTSC system). Therefore, the output video signal from the frame synchronizer has a delay of about one frame period in comparison with an audio signal. The time delay between the output video signal and the audio signal is called "lip-lag" and, therefore, causes a serious phenomenon in which the motion of an announcer's lip on a picture monitor and his voice are not synchronous with each other. The one frame time delay is caused as follows. In the frame synchronizer, the input video signal is processed through low-pass filtering, analog-to-digital (A/D) converting and serial-to-parallel data converting prior to being stored in a frame memory during a writing phase. In consequence, delays of 595 n sec, 70 n sec and 1680 n sec in such respective processes, i.e., 2,345 µsec of total delay, for example, occur. On the other hand, delays of 70 n sec due to digital-to-analog (D/A) converting and 595 n sec due to low-pass filtering, i.e., 0.665 µsec of total delay occur during a reading phase. A delay of 840 n sec is further derived when an inverter for a chrominance component is arranged between the frame memory and a D/A converter. In this case, a total delay of 1.505 µsec occurs at the reading side. Therefore, a total delay of at least 3.85 µsec, which represents an offset delay unavoidably occurs when a television video signal is transmitted through the frame synchronizer. In the common synchronism mode of use of the frame synchronizer, the slight phase difference between the input video signal and the reference timing (the output video signal) is, of course, less than 3.85 µs and, therefore, the reading operation is controlled to be delayed by about one frame period after the writing operation in order to accurately synchronize the input video signal with the reference timing. In consequence, the undesirable "lip-lap" is introduced between the output video signal and the audio signal.

Conventionally, an audio signal delay apparatus is provided in order to compensate for the above-mentioned "lip-lag". However, the audio signal delay apparatus for one frame period is considerably large in size and involves complicated hardware.

SUMMARY OF THE INVENTION

It is, therefore, an object of the present invention to provide a television video signal synchronizing apparatus which makes it possible to reduce a time delay between an output video signal and an audio signal to about 1/525 of the time delay in the prior art when the television video signal synchronizing apparatus is used for implementing a common synchronism use, without employing any audio signal delay apparatus.

To this end, according to the present invention, there is provided a television video signal synchronizing apparatus comprising: a memory for storing an input video signal; a writing address generator which produces a writing address for storing the input video signal into the memory in synchronism with the input video signal; and a reading address generator which produces a reading address for reading out the stored video signal to deliver an output television signal in accordance wih a reference timing, wherein the reading address is controlled so as to read out an active video portion of the stored video signal after about a one-horizontal scanning period (63.5 µs in the NTSC system) just after the writing operation proceeds.

BRIEF DESCRIPTION OF THE DRAWINGS

FIGS. 3(A) and 3(B) show corresponding relative locations of the various portions in a television video signal between a writing side and a reading side according to the present invention.

DESCRIPTION OF THE PREFERRED EMBODIMENTS

Figure 1:
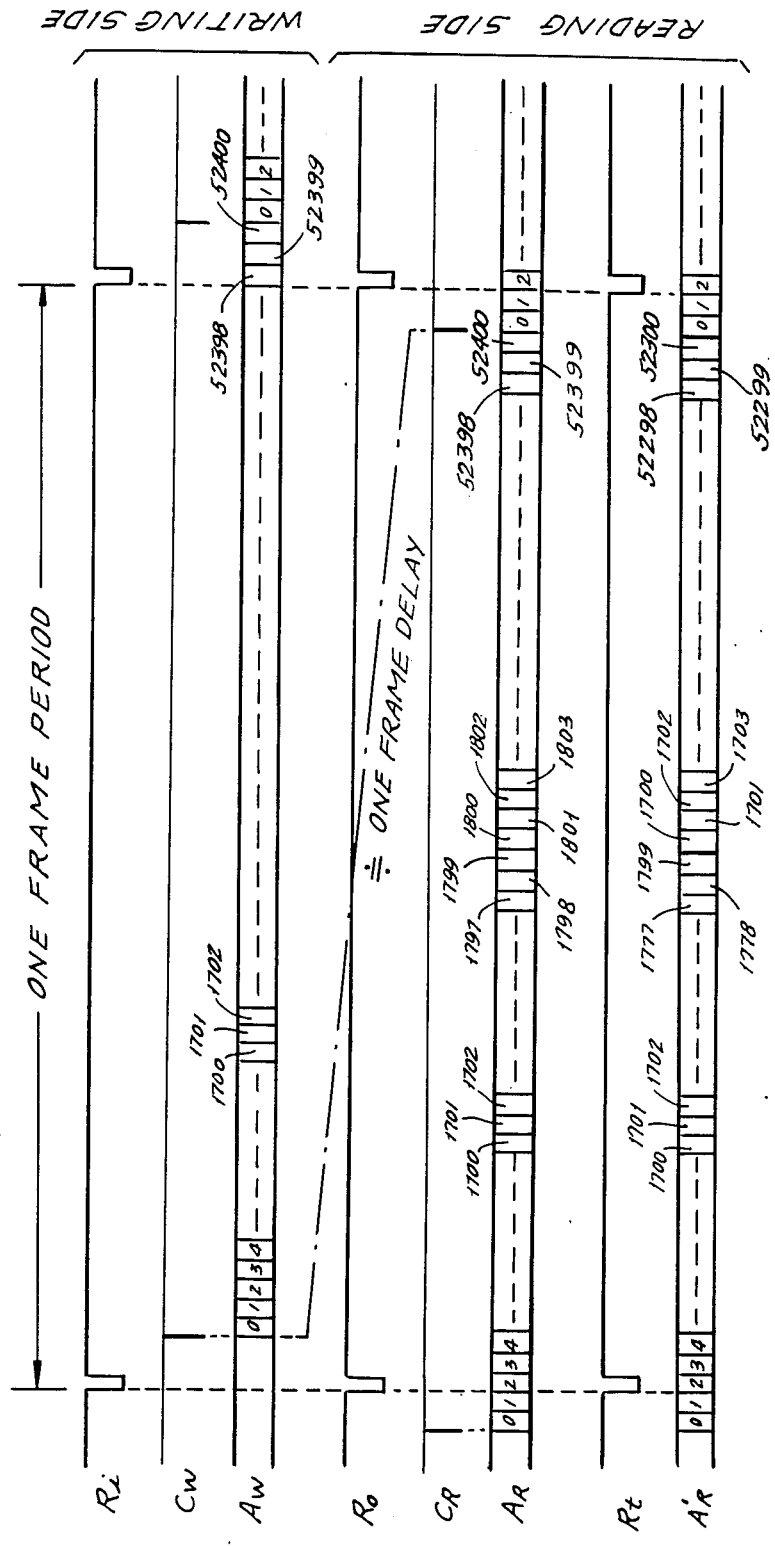
FIG. 1 is a timing chart for explaining the operation of the present invention.

Referring first to FIG. 1, the timing (one frame period) of an input video signal is represented by $R_i$, and a timing mark indicating the writing of the input video signal into a memory is slightly delayed as shown by $C_w$. The timing $C_w$ is coincident with a clear timing of a write address $A_W$. The write address $A_W$ advances from 0 to 52400 during one frame period after the clear timing $C_w$ as shown in the Figure. In this Figure, in order to facilitate its understanding, it is assumed that a one-horizontal period requires 100 write addresses and that one frame includes 525 horizontal scannings. Assuming that the frame synchronizer is used for the common synchronism use, a read reference timing $R_o$ can be represented by the same timing as the input timing $R_i$. In fact, there is a slight phase difference between the timings $R_i$ and $R_o$ but this slight phase difference is not apparent in this larger scale Figure. If a read address is produced based on the timing $R_o$, the phase of the output video signal delivered from the frame synchronizer is not coincident with the timing $R_O$. Therefore, in order to obtain coincidence there between, the read address timing is set to take place at the mark $C_R$ associated with the waveform shown in the Figure. This read address timing $C_R$ is produced with reference to the timing $R_O$ by delaying the timing signal $R_O$. This delay is easily obtained by delaying the read reference timing $R_O$ by a predetermined amount or by setting an offset address value in the read-address counter.

A reading address $A_R$ produced in acordance with the timing $C_R$ generates the address as shown in the Figure. Let it be assumed that the beginning address of an active video portion is 1700. Since the reading address 1700 is a little advanced in relation to the writing address $A_W$ 1700, the contents of the memory read out at the reading address $A_R$ 1700 are delayed about one frame when the conventional reading is done. As a result, the phase timing of the output television signal delivered from the frame synchronizer at $R_t$, which coincides with the input timing $R_i$.

In the present invention, since the updating of one vertical address, namely that of the first active video line, in the reading address is suspended for one horizontal scanning period, the reading addresses between 1700 and 1799 are repeated twice as shown in a reading address line designated $A_R'$ in FIG. 1. In this case, the timing of the reading address $A_R'$ 1700 of the second time is located just after the timing of the writing address $A_W$ 1700 with a delay of by about one horizontal scanning period (1 H), and consequently, the active video portion of the input video signal stored into the memory is immediately read out with a delay of about 1 H period.

In practice, if the reading operation delayed by about 1 H period is performed it is possible to minimize the delay of the output video signal to the audio signal. In this case, however, in prior art devices the output video signal is undesirably shifted on a picture monitor from a regular position by one line in the vertical direction. Sometimes the television video signal contains other signals than video information, e.g., test signals (VITS), during the vertical blanking period. The insertion position of the VITS in the television video signal must not be changed under the official standards. In the present invention, therefore, the active video portion is read out after being delayed by about 1 H period, but the remaining portion (the vertical blanking interval) is read out in the same manner as that in the prior art. Thereby, it is possible to obtain a synchronized television video signal in which the gap between the video and audio signals is minimized for the active video portion and there is no change of the position of the other signals inserted in the vertical blanking portion. Although, on a television monitor screen, a position of video contents is downwardly shifted by one horizontal scanning line this shift will not be discernible to an observer.

Figure 2:
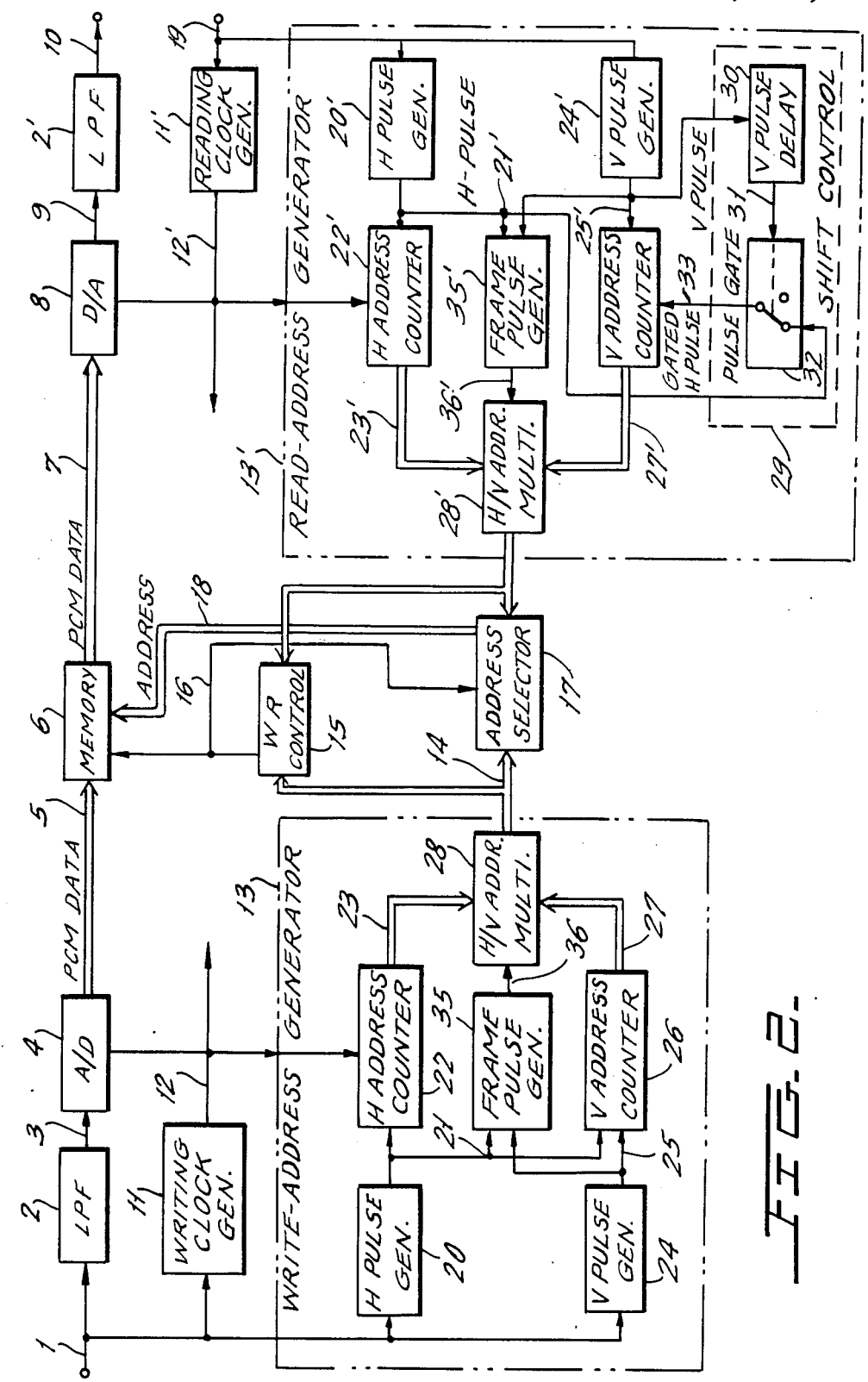
FIG. 2 shows a first embodiment according to the present invention.

Referring now to FIG. 2, an input television video signal 1 is fed into a low pass filter 2 in which frequency components higher than 7.16 MHz are renewed. Then, the video signal 3 delivered from the low pass filter 2 is sampled at 14.3 MHz by an analog-to-digital (A/D) converter 4 and converted into a PCM parallel 8-bit data 5. Additionally, a writing clock generator 11 produces a writing clock pulse 12 synchronized with the color burst signal in the input video signal 1. A writing address generator 13 produces a writing address 14 synchronized with a synchronizing signal in the input video signal 1. Then, the PCM data 5 of one frame (33.3 msec) is stored in digital memory 6 having a capacity of about 4.7 megabits under the control of the writing address 14. The writing address generator 13 includes a horizontal (H) pulse separator 20, a vertical (V) pulse separator 24, and H address counter 22, a frame pulse generator 35, a V address counter 26 and a H/V address multiplexer 28.

On the other hand, a reading clock pulse 12' synchronized with the color burst signal in a reference signal 19 is produced by a reading clock generator 11', and supplied to a reading address generator 13'. The reading address generator 13' generates a reading address 14' synchronized with a synchronizing signal in the reference signal 19. The PCM data 7 stored in the memory 6 is read out under the control of the reading address 14' and converted into a PAM signal 9 by a D/A converter 8. The PAM signal 9 from the D/A converter 8 is then fed into a low pass filter 2' where any spurious component higher than 7.16 MHz is eliminated. Thereby, an output television video signal 10 synchronized with the reference signal 19 is obtained from the low pass filter 2'. Similarly to the writing address generator 13, the reading address generator 13' includes an H pulse separator 20', a V pulse separator 24', an H address counter 22', a frame pulse generator 35', a V address counter 26' and an H/V address multiplexer 28'. In FIG. 2, a memory address selector 17 and a writing/reading controller 15 are further provided. Since the above-mentioned configurations in FIG. 2 is well known in the art of the conventional frame synchronizer, the detailed description of the operation thereof is omitted.

In the present invention, a shift controller 29 is added in the reading address generator 13'. In the shift controller 29, the V pulse 25' delivered from the V pulse separator 24' is delayed to a time point at which an active video portion begins by a delay circuit 30 which has a delay time of 17 H. The output of the delay circuit 30 is supplied to a pulse gate circuit 32 as a control signal 31. In the reading address generator 13', the H pulse 21' delivered from the H pulse generator 20' is supplied through the pulse gate circuit 32 to the V address counter 26' where the H pulse 21' is applied as a clock. Therefore, the pulse gate circuit 32 eliminates one of the H pulse 21' in response to the control signal 31. Accordingly, the V address 27' produced in the V address counter 26' is suspended at the time point at which the active video portion begins. This means that the written video data of the active video portion is immediately read out as shown in FIG. 1. Thus, the time lag between the audio signal and the video signal is substantially eliminated.

FIGS. 3(A) and 3(B) show schematically the relative locations of portions of the contents of an input television signal at an input phase and at an output phase. These figures indicate, on the writing side (input phase), the input television video signal 1(a) and the writing V address 27(b); and, on the reading side (output phase), the output television video signal 10(c), the H pulse 21'(e), the delayed V pulse 31(f) and the reading V address 27'(h). FIGS. 3(A) and 3(B) correspond to cases of the odd field and the even field, respectively. FIGS. 3(A) and 3(B) show only V (vertical) addresses. In addition, unlike those in FIG. 1, the addresses are not set during the whole field period but corresponding to an actual operation of the frame synchronizer in which they are not set during a certain beginning period of the vertical blanking period. Further, contents shown by broken line represents a signal superimposed in the vertical blanking portion, such as VITS. As shown in FIGS. 3(A) and 3(B), the insertion positions of the VITs in the vertical blanking period are not shifted in the television video signal between the writing side and the reading side, but the active video portion following line 21 of the reading side is shifted by one line with respect to that of the writing side.

The writing V address counter 26 (FIG. 2) is cleared by the V pulse 25 after four H periods in the vertical blanking period and employs the H pulse 21 as the clock. Accordingly, the writing V address 27 is counted up every H period as shown in (b) of FIGS. 3(A) and 3(B). The reading V address counter 26' performs an operation similar to that of the writing V address counter 26. However, since the eighteenth pulse of H pulse 21' (e) is inhibited under the control of the control signal 31 (f) which corresponds to the beginning of active video portion, the V address 27' is suspended at the inhibited timing as shown in (h). Accordingly, the input television video signal 1 during the active video period is immediately read out within one H delay after being written into the frame memory 6, that is, the output television video signal 10 is not delayed by 33 msec. The output television video signal 10 is shifted in the vertical direction on the screen with only one H delay and, of course, synchronized in the horizontal direction. At this time, the reading V address 27 repeats the same vertical address (17) at the 22rd H in the television signal. On the other hand, with respect to the portion of the television signal before the active video signal portion, particularly the portion for the VITS between the 10th H and 21st H during the vertical blanking period, the vertical addresses are the same on both the writing side and the reading side as will be obvious from the comparison between (b) and (h). Therefore, the VITS signal before one frame period, which has been written into the frame memory 6, is obtained without the one H shift in the vertical direction.

Figure 4:
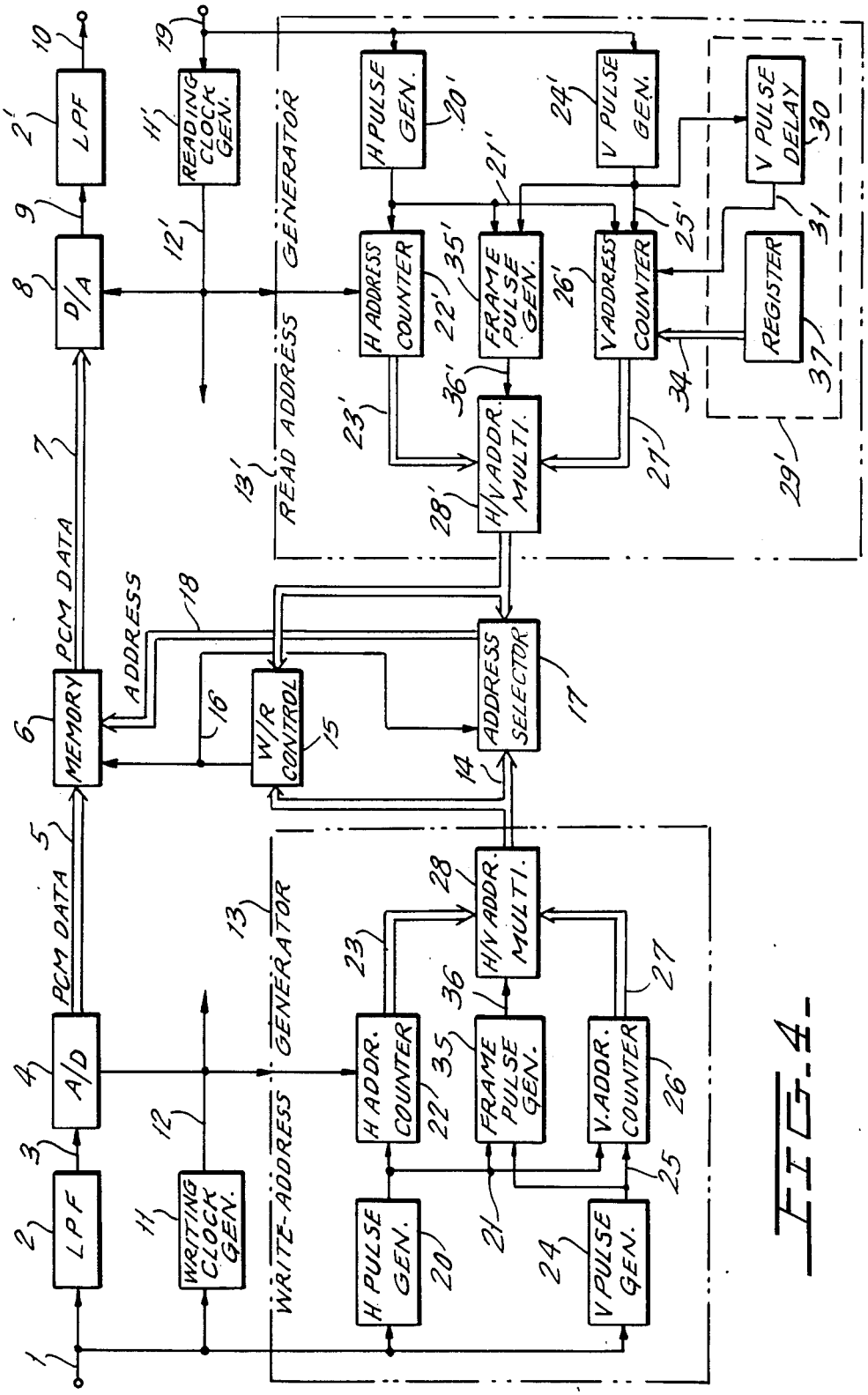
FIGS. 4 and 5 show second and third embodiments according to the present invention, respectively.

Referring to FIG. 4 showing a second embodiment of the invention, a vertical address during the active video portion can be similarly shifted by 1 H read address by applying the control signal (delayed V pulse) 31 to load a vertical address data 34 to the read V address counter 26'. The loaded vertical address data is supplied from a load data register 37 and the value of the loaded address data for example, is "17" in the case of FIGS. 3(A) and 3(B).

Figure 5:
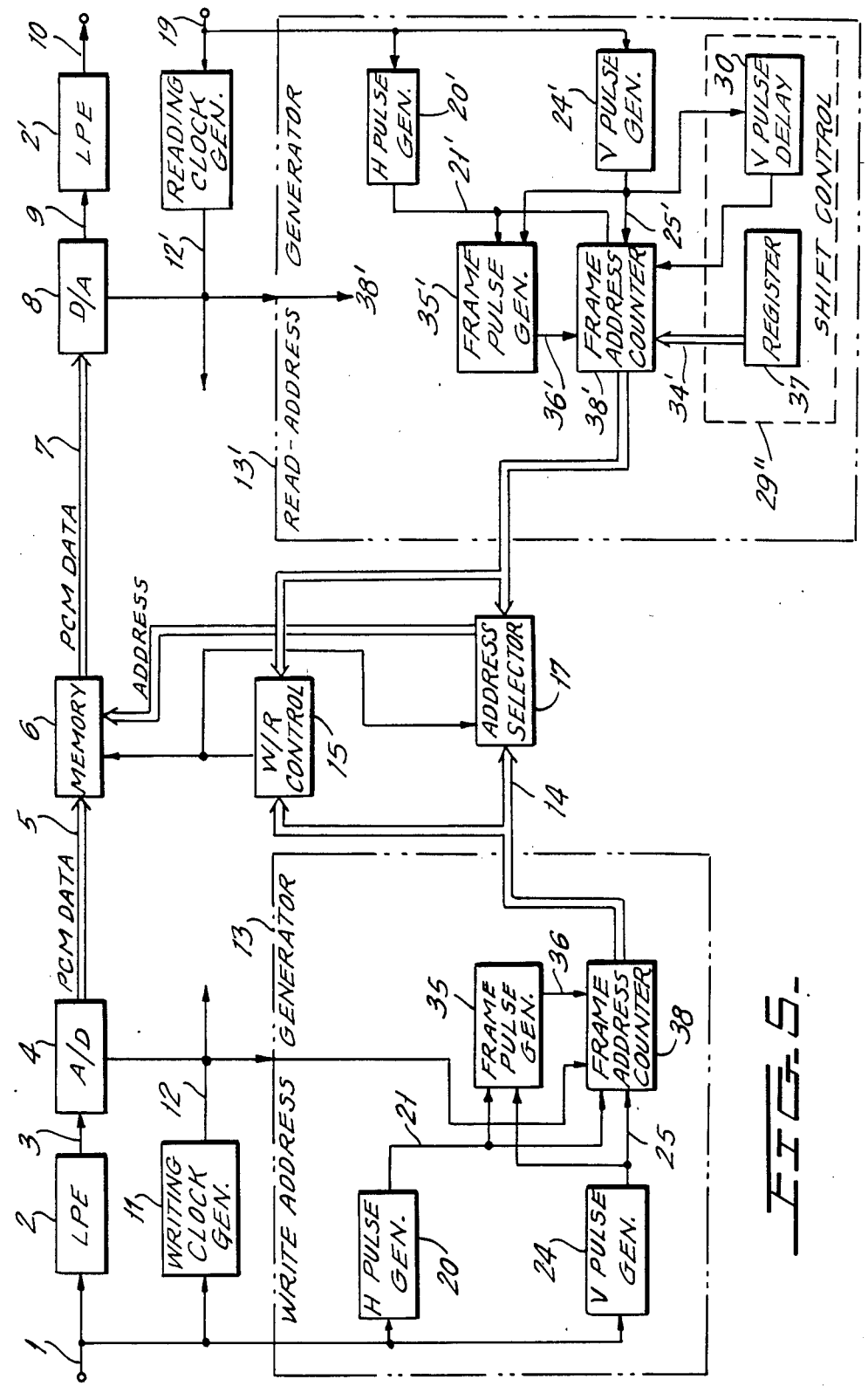

In FIGS. 2 and 4, the address arrangement on each of the writing side and the reading side is the two-dimensional address arrangement, i.e., the horizontal and vertical addresses. However, it is possible to obtain the same effect in a one-dimensional address arrangement without dividing the address into two dimensions. In FIG. 5 showing a third embodiment of the present invention, a frame address counter 38 for the one-dimensional address arrangement is provided and the load data register 37 supplies a writing address 34 to the frame address counter 38 in order to load a desired address at the timing of the control signal 31 delivered from the delay circuit 30.

As described above, the present invention advantageously makes it possible to minimize the delay of the active video portion without making one H shift of the VITS signal, by providing the delay circuit in the reading address generator.

What is claimed is:

1. An apparatus for synchronizing an input television video signal with a reference signal, comprising:
   means for producing a sequence of writing addresses comprising sequences of horizontal and vertical writing address components in synchronism with said input television video signal;
   memory means for storing said input television video signal under the control of said sequence of writing addresses; and
   means for producing a corresponding sequence of reading addresses comprising sequences of horizontal and vertical reading address components in synchronism with said reference signal, said sequence of writing addresses being delayed with respect to said corresponding sequence of reading addresses, said stored video signal in said memory means being read out under the control of said corresponding sequence of reading addresses to deliver an output video signal, said means for producing reading addresses further comprising means for holding said sequence of vertical reading address components for a predetermined period when said sequence of reading addresses reaches a value corresponding to an active video portion of said stored video signal to delay said corresponding sequence of reading addresses with respect to said sequence of writing addresses.

2. A television video signal synchronizing apparatus as in claim 1, wherein said predetermined period for holding said sequence of vertical reading address components is one horizontal scanning period.

3. A television video signal synchronizing apparatus as in claim 1, wherein said reading address producing means includes means for counting horizontal synchronizing pulses extracted from said reference signal to produce said sequence of vertical reading address components and wherein said holding means includes means for inhibiting the counting of one of said horizontal synchronizing pulses when said sequence of vertical reading address components reaches said value.

4. An apparatus as in claim 3, wherein said inhibiting means comprises:
   a delay circuit for delaying vertical pulses associated with said reference signal; and
   a pulse gate circuit, said pulse gate circuit receiving said horizontal synchronizing pulses and the delayed vertical pulses and inhibiting said one of said horizontal synchronizing pulses when said value is reached so that a predetermined sequence of vertical reading address components is repeated for two successive horizontal scanning periods.

5. An apparatus as in claim 3, wherein said inhibiting means comprises:
   a delay circuit for delaying vertical pulses associated with said reference signal to produce delayed vertical pulses; and
   a register containing a predetermined vertical address value, said delayed vertical pulses operating to load, into said means for producing said sequence of vertical reading address components, said predetermined vertical address value.

6. An apparatus as in claim 4, wherein the delay between said vertical pulses and said delayed vertical pulses equals seventeen of said horizontal synchronizing pulses.

7. An apparatus as in claim 5, wherein the delay between said vertical pulses and said delayed vertical pulses equals seventeen of said horizontal synchronizing pulses.

8. An apparatus for synchronizing an input television video signal with a reference signal, comprising:
- means for producing a sequence of writing addresses including sequences of horizontal and vertical writing address components in synchronism with said input television signal;
- memory means for storing said input television video signal under the control of said sequence of writing addresses;
- means for producing a corresponding sequence of reading addresses including sequences of horizontal and vertical reading address components in synchronism with said reference signal, said sequence of writing addresses being delayed with respect to said corresponding sequence of reading addresses, said stored video signal in said memory means being read out under the control of said corresponding sequence of reading addresses to deliver an output video signal, said sequence of vertical reading address components being produced by counting horizontal synchronizing pulses extracted from said reference signal; and
- means for holding said sequence of vertical reading address components for a predetermined period when said sequence of reading addresses reaches a value corresponding to an active video portion of said stored video signal to delay said corresponding sequence of reading addresses with respect to said sequence of writing addresses, said holding means including:
- a delay circuit for delaying vertical pulses extracted from said reference signal, and
- a pulse gate circuit, said pulse gate circuit receiving said horizontal synchronizing pulses and the delayed vertical pulses and inhibiting the counting of one of said horizontal synchronizing pulses when said value is reached so that a predetermined sequence of vertical reading address components is held.

9. An apparatus for synchronizing an input television video signal with a reference signal, comprising:
- means for producing a sequence of writing addresses including sequences of horizontal and vertical writing address components in synchronism with said input television video signal;
- memory means for storing said input television video signal under the control of said sequence of writing addresses;
- means for producing a corresponding sequence of reading addresses including sequences of horizontal and vertical reading address components in synchronism with said reference signal, said sequence of writing addresses being delayed with respect to said corresponding sequence of reading addresses, said stored video signal in said memory means being read out under the control of said corresponding sequence of reading addresses to deliver an output video signal, said sequence of vertical reading address components being produced by counting horizontal synchronizing pulses extracted from said reference signal; and
- means for holding said sequence of vertical reading address components for a predetermined period when said sequence of reading addresses reaches a value corresponding to an active video portion of said stored video signal to delay said sequence of reading addresses with respect to said sequence of writing addresses, said holding means including:
- a delay circuit for delaying vertical pulses extracted from said reference signal to produce delayed vertical pulses, and
- a register containing a predetermined vertical address value, said delayed vertical pulses operating to load said predetermined vertical address value into said means for producing said sequence of vertical reading address components.

* * * * *